United States Patent
Kamble et al.

(10) Patent No.: US 9,571,338 B2
(45) Date of Patent: Feb. 14, 2017

(54) SCALABLE DISTRIBUTED CONTROL PLANE FOR NETWORK SWITCHING SYSTEMS

(71) Applicant: Lenovo Enterprise Solutions (Singapore) Pte. Ltd., Singapore (SG)

(72) Inventors: Keshav G. Kamble, Fremont, CA (US); Dar-Ren Leu, San Jose, CA (US); Vijoy A. Pandey, San Jose, CA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 652 days.

(21) Appl. No.: 13/831,029

(22) Filed: Mar. 14, 2013

(65) Prior Publication Data
US 2014/0280827 A1    Sep. 18, 2014

(51) Int. Cl.
*H04L 12/24*    (2006.01)
*G06F 9/455*    (2006.01)
*H04L 29/12*    (2006.01)

(52) U.S. Cl.
CPC ......... *H04L 41/08* (2013.01); *G06F 9/45558* (2013.01); *G06F 2009/45595* (2013.01); *H04L 61/6022* (2013.01)

(58) Field of Classification Search
CPC ...... H04L 49/35; H04L 49/70; H04L 12/4633; H04L 12/5693; H04L 45/28; H04L 45/38; H04L 45/42; H04L 45/66; H04L 45/74; H04L 41/08; H04L 41/0803; H04L 41/0806; H04L 47/12; H04L 47/15; H04L 61/6022; G06F 15/177; G06F 2009/45595; G06F 9/45558

See application file for complete search history.

(56) References Cited

U.S. PATENT DOCUMENTS

| 2007/0036178 | A1 | 2/2007 | Hares et al. |
| 2010/0061242 | A1* | 3/2010 | Sindhu ............... H04L 41/0806 370/235 |
| 2010/0214949 | A1 | 8/2010 | Smith et al. |

(Continued)

OTHER PUBLICATIONS

Media Access Control (MAC) Bridges and Virtual Bridged Local Area Networks, IEEE Std 802.1q(TM), May 16, 2011.*

(Continued)

*Primary Examiner* — Nicholas Taylor
*Assistant Examiner* — Michael Li
(74) *Attorney, Agent, or Firm* — Zilka-Kotab, PC

(57) ABSTRACT

In one embodiment, a networking system includes a physical switch and a scalable and distributed virtual control plane. The switch is adapted to receive a first packet, classify the first packet to produce a packet classification, generate a second packet based on the first packet, and forward the second packet. The scalable and distributed virtual control plane has a physical host server adapted to host a plurality of virtual machines (VMs), each VM providing a control plane for a particular protocol, and a network connecting the switch to the server. In addition, the plurality of VMs are adapted to receive the second packet, retrieve information about the first packet, handle processing of the first packet using the information to obtain forwarding information, encapsulate the first packet into a third packet including the forwarding information, and forward the third packet according to the forwarding information.

15 Claims, 8 Drawing Sheets

(56) References Cited

U.S. PATENT DOCUMENTS

| | | |
|---|---|---|
| 2011/0023029 A1 | 1/2011 | Diab et al. |
| 2011/0292836 A1* | 12/2011 | Bragg et al. .................. 370/255 |
| 2011/0299413 A1 | 12/2011 | Chatwani et al. |
| 2012/0014284 A1 | 1/2012 | Ranganathan et al. |
| 2013/0044636 A1* | 2/2013 | Koponen ................ H04L 47/12 370/254 |
| 2014/0280841 A1 | 9/2014 | Kamble et al. |

OTHER PUBLICATIONS

Galan et al., "Control plane virtual extension for GMPLS-based optical networking testbeds," IEEE, Proc. Workshop in MPLS/GMPLS Networks, Apr. 2007, pp. 1-13.

Shimonishi et al., "Virtualized network infrastructure using OpenFlow," Network Operations and Management Symposium Workshops, 2010 IEEE/IFIP, Apr. 19-23, 2010, pp. 74-79.

Koponen et al., "Onix: A Distributed Control Platform for Large-Scale Production Networks," OSDI, Oct. 2010, usenix.org, pp. 1-14.

Li et al., "Real-time network simulation support for scalable routing experiments," International Journal of Simulation and Process Modelling, vol. 5, No. 2, 2009, pp. 146-156.

Anhalt et al., "Specifying and Provisioning Virtual Infrastructures with HIPerNET," International Journal of Network Management, Jan. 15, 2010, vol. 20, pp. 129-148.

Non-Final Office Action from U.S. Appl. No. 14/062,817, dated Apr. 1, 2015.

Kamble et al., U.S. Appl. No. 14/062,817, filed Oct. 24, 2013.

Final Office Action from U.S. Appl. No. 14/062,817, dated Oct. 8, 2015.

Non-Final Office Action from U.S. Appl. No. 14/062,817, dated Mar. 21, 2016.

* cited by examiner

SCALABLE DISTRIBUTED CONTROL PLANE FOR NETWORK SWITCHING SYSTEMS

BACKGROUND

The present invention relates to data center infrastructure, and more particularly, this invention relates to a scalable distributed control plane for network switching systems.

As the size of a physical networking system increases (e.g., number of ports, an aggregation of multiple ports, multiple physical networking systems used to simulate a larger physical networking system, number of network control protocols, etc.), the requirements and demands made on a control plane for the network (which contains processors, buses, I/O, and other associated resources across many different physical entities) also increase. However, typically a control plane may have limited physical capabilities and is limited to a single switching component in the network. Therefore, each control plane would be incapable of scaling to the degree necessary to handle all demands made thereof when the size of a physical networking system increases to a certain degree.

Therefore, there is a need for improved control plane capabilities, particularly capabilities for scaling up to handle additional control packet processing capabilities that are required in a fast and large networking system.

SUMMARY

In one embodiment, a networking system includes at least one physical networking switch and a scalable and distributed virtual control plane. The switch has logic adapted to receive a first networking packet, logic adapted to classify the first networking packet to produce a packet classification, logic adapted to generate a second networking packet based on the first networking packet, and logic adapted to forward the second networking packet. The scalable and distributed virtual control plane has at least one physical host server adapted to host a plurality of virtual machines (VMs), each VM being adapted for providing a control plane for a particular protocol, and a network connecting the at least one physical networking switch to the at least one physical host server. In addition, the plurality of VMs include logic adapted to receive the second networking packet, logic adapted to decapsulate the second networking packet to retrieve information about the first networking packet, logic adapted to handle processing of the first networking packet using the information about the first networking packet to obtain forwarding information sufficient to allow the first networking packet to be delivered to its intended destination, logic adapted to encapsulate the first networking packet into a third networking packet including the forwarding information, and logic adapted to forward the third networking packet according to the forwarding information.

According to yet another embodiment, a computer program product for processing a first networking packet within a networking system includes a computer readable storage medium having computer readable program code embodied therewith. The computer readable program code includes computer readable program code configured to receive a first networking packet, computer readable program code configured to classify the first networking packet to produce a packet classification, computer readable program code configured to determine a destination address to send the first networking packet based on the packet classification in order to provide processing for the first networking packet by: selecting a condition from a look-up table to which the packet classification adheres, selecting an entry associated with the selected condition, and determining a set of information associated with the selected entry, computer readable program code configured to generate a second networking packet by encapsulating the first networking packet into the second networking packet, and computer readable program code configured to forward the second networking packet to at least one physical host server to handle processing of the first networking packet. The look-up table includes a plurality of entries, a plurality of conditions, and a plurality of sets of information, each condition is associated with one entry, each entry is associated with one set of information, each set of information includes destination information for one of a plurality of VMs, each VM being adapted for providing a control plane for a particular protocol, any entry is capable of being associated with more than one condition, each set of information includes at least: an address identifier (ID), a service tag, and a media access control (MAC) ID, the address ID includes information that corresponds to one or more egress ports of a physical networking switch, the MAC ID includes a destination address that corresponds to at least one VM of the plurality of VMs designated to receive the second networking packet hosted by the at least one physical host server based on the packet classification, and the service tag includes information that corresponds to a membership of the second networking packet within one virtual local area network (VLAN) in accordance with any one of: a networking protocol, a port based protocol, and a port based networking protocol.

Other aspects and embodiments of the present invention will become apparent from the following detailed description, which, when taken in conjunction with the drawings, illustrate by way of example the principles of the invention.

DETAILED DESCRIPTION

Figure 1:
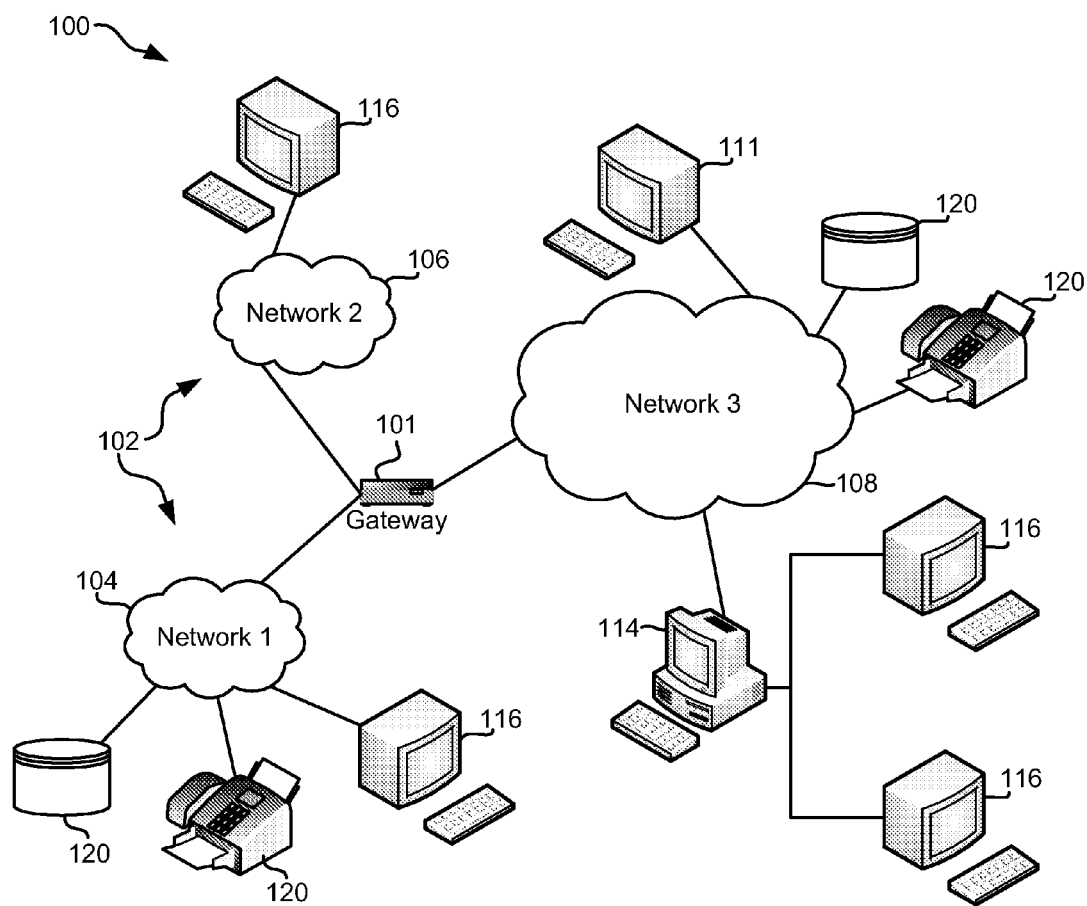
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, an improved networking system comprises a scalable and distributed virtual control plane and at least one physical networking switch. The scalable and distributed virtual control plane comprises at least one physical host server that is capable of hosting a plurality of virtual machines (VMs). Each VM is capable of handling the processing of at least one type of networking packet that is received by the physical networking switch. Each server hosting a VM which is capable of handling the processing of at least one type of networking packet is identifiable and accessible using a physical CPU port and a virtual local area network (VLAN) tag, while each VM is accessible and identified by a unique VM media access control (MAC) address, according to one embodiment.

The distributed virtual control plane enables offloading of the processing of control packets to one or more VMs, and also the flexibility and ability to easily scale the control plane in response to changes in the networking system's scalability requirements due to additions resulting in the expansion of the data plane. In one embodiment, the distributed virtual control plane comprises multiple VMs, with each VM being capable of processing control packets that are of a different type than the other VMs. In this way, divisions in the control plane may be made across the various VMs. There are many different possible combinations to optimize the usage of the distributed virtual control plane given specifications and additional user requirements or conditions that are desired to be met.

In one general embodiment, a networking system includes at least one physical networking switch and a scalable and distributed virtual control plane. The switch has logic adapted to receive a first networking packet, logic adapted to classify the first networking packet to produce a packet classification, logic adapted to generate a second networking packet based on the first networking packet, and logic adapted to forward the second networking packet. The scalable and distributed virtual control plane has at least one physical host server adapted to host a plurality of virtual machines (VMs), each VM being adapted for providing a control plane for a particular protocol, and a network connecting the at least one physical networking switch to the at least one physical host server. In addition, the plurality of VMs include logic adapted to receive the second networking packet, logic adapted to decapsulate the second networking packet to retrieve information about the first networking packet, logic adapted to handle processing of the first networking packet using the information about the first networking packet to obtain forwarding information sufficient to allow the first networking packet to be delivered to its intended destination, logic adapted to encapsulate the first networking packet into a third networking packet including the forwarding information, and logic adapted to forward the third networking packet according to the forwarding information.

In another general embodiment, a method for processing a first networking packet within a networking system includes receiving a first networking packet using a physical networking switch, classifying, using the physical networking switch, the first networking packet to produce a packet classification, generating, using the physical networking switch, a second networking packet based on the first networking packet, forwarding the second networking packet using the physical networking switch, receiving the second networking packet using a physical host server, wherein the physical host server is adapted to host a plurality of VMs, each VM being adapted for providing a control plane for a particular protocol, receiving, using a VM hosted by the physical host server, the second networking packet, decapsulating, using the VM, the second networking packet to retrieve information about the first networking packet, handling, using the VM, processing of the first networking packet using the information about the first networking packet to obtain forwarding information sufficient to allow the first networking packet to be delivered to its intended destination, encapsulating, using the VM, the first networking packet into a third networking packet including the forwarding information, and forwarding, using the VM, the third networking packet according to the forwarding information.

According to yet another general embodiment, a computer program product for processing a first networking packet within a networking system includes a computer readable storage medium having computer readable program code embodied therewith. The computer readable program code includes computer readable program code configured to receive a first networking packet, computer readable program code configured to classify the first networking packet to produce a packet classification, computer readable program code configured to determine a destination address to send the first networking packet based on the packet classification in order to provide processing for the first networking packet by: selecting a condition from a look-up table to which the packet classification adheres, selecting an entry associated with the selected condition, and determining a set of information associated with the selected entry, computer readable program code configured to generate a second networking packet by encapsulating the first networking packet into the second networking packet, and computer readable program code configured to forward the second networking packet to at least one physical host server to handle processing of the first networking packet. The look-up table includes a plurality of entries, a plurality of conditions, and a plurality of sets of information, each condition is associated with one entry, each entry is associated with one set of information, each set of information includes destination information for one of a plurality of VMs, each VM being adapted for providing a control plane for a particular protocol, any entry is capable of being associated with more than one condition, each set of information includes at least: an address identifier (ID), a service tag, and a media access control (MAC) ID, the address ID includes information that corresponds to one or more egress ports of a physical networking switch, the MAC ID includes a destination address that corresponds to at least one VM of the plurality of VMs designated to receive the second networking packet hosted by the at least one physical host server based on the packet classification, and the service tag includes information that corresponds to a membership of the second networking packet within one virtual local area network (VLAN) in accordance with any one of: a networking protocol, a port based protocol, and a port based networking protocol.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention.

It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
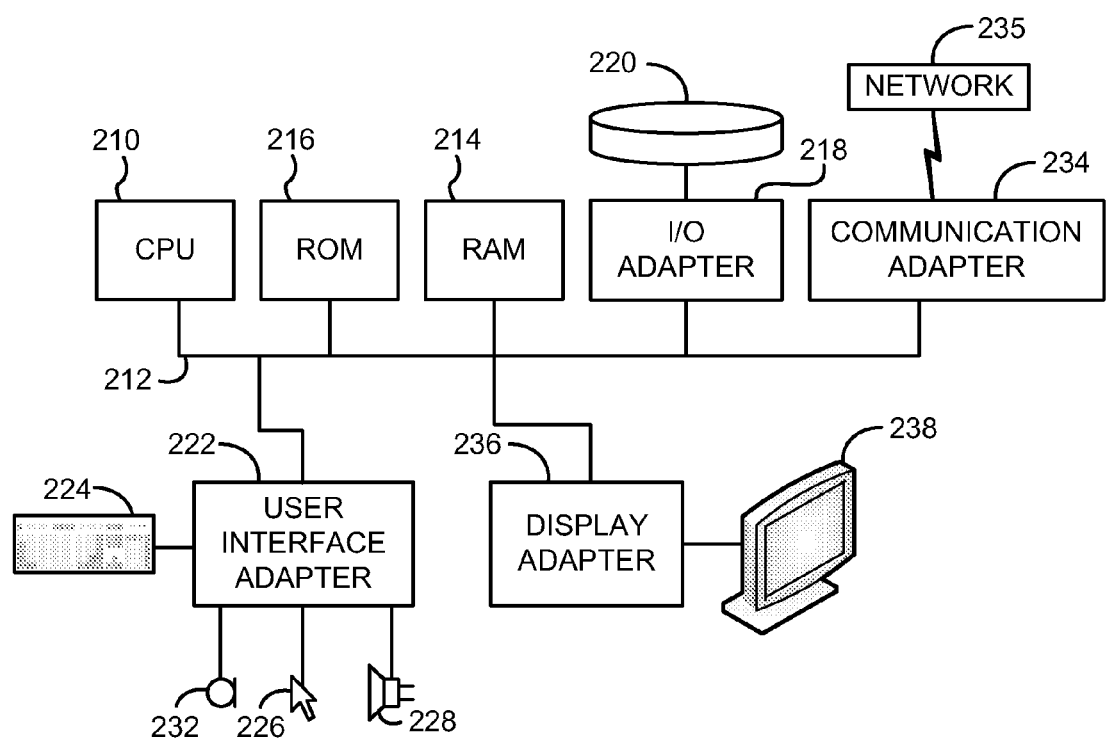
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Currently, methods of achieving interconnectivity between a large number of layer 2 ports rely on having numerous discrete switches each running spanning tree protocol (STP) or transparent interconnect of lots of links (TRILL). Unfortunately, by using discrete switches, a lookup needs to be performed using a lookup table at each hop between two of the discrete switches, which not only adds latency to the process, but also makes the process latency unpredictable as the network evolves and changes.

On the other hand, distributed switches relying on a cell-based fabric interconnect have an advantage of providing predictable, low latency for setups in which interconnectivity between a large number of ports is desired. A distributed switch appears to be a single, very large switch, with the single ingress lookup specifying the index needed to traverse the network. The edge facing switches are interconnected using cell-based Clos fabrics, which are wired in a fixed fashion and rely on the path selection made at the ingress.

Unfortunately, as the number of ports in a distributed switch grows, software that manages the network must struggle to accommodate the increased number of link up and/or link down events (link events) and processing. Control protocols, like STP and intermediate system to intermediate system (ISIS), will see a large number of link events, which will stress their convergence times if they continue to exist as monolithic elements.

Figure 3:
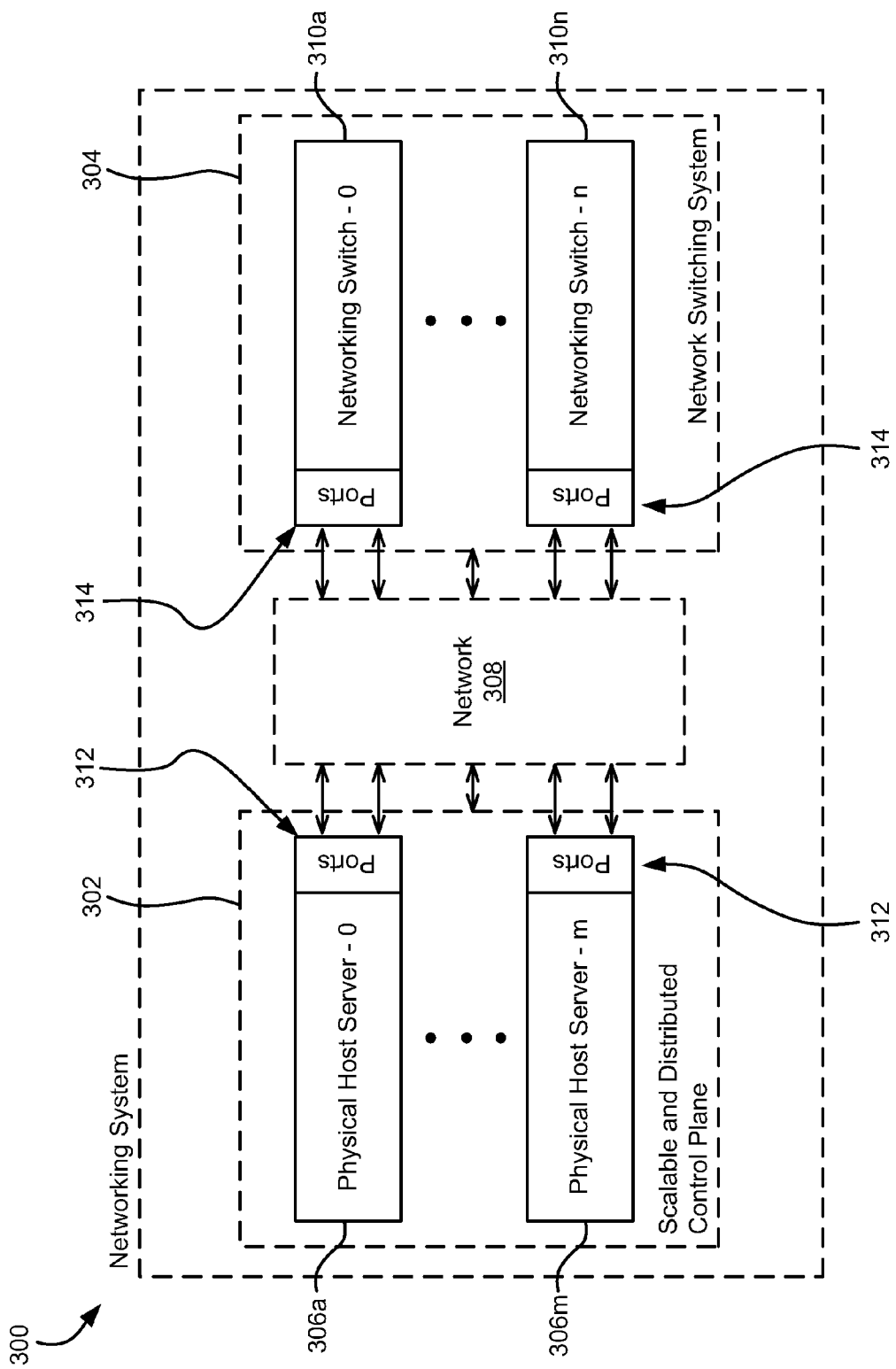
FIG. 3 shows a simplified diagram of a network switching system, according to one embodiment.

Now referring to FIG. 3, a networking system 300 is shown according to one embodiment. The networking system 300 may also be referred to as a switch. In one embodiment, the networking system 300 comprises at least one networking switch 310a . . . 310n which may be arranged in a network switching system 304. The network switching system 304 is coupled to a scalable and distributed virtual control plane 302 via a network 308. The network 308 may be any type of network comprising any number of networking elements therein, such as switches, routers, subnets, wires, cables, etc., as would be known to one of skill in the art. In one embodiment, the network 308 may be as simple as a cable plant and/or communication channels utilizing a communication network.

The scalable and distributed virtual control plane 302 may comprise at least one physical host server 306a, and may include a plurality of physical host servers 306a, . . . , 306m, which may or may not be physically located in the same location or area, geographically, as the network switching system 304. That is to say, the network switching system 304 and the scalable and distributed virtual control plane 302 may be located remotely of one another. Each physical host server 306a, . . . , 306m comprises at least one port 312 for connecting to other network elements and forwarding and/or receiving packets. Any connection type known in the art may be used with the at least one port 312.

In addition, the network switching system 304 may comprise at least one physical networking switch 310a, . . . , 310n, such as a networking switch of a type known in the art. Each of the physical networking switches 310a, . . . , 310n may include at least one ingress port to receive an incoming packet, and at least one egress port to transmit or forward an outgoing packet, shown collectively as ports 314. Each ingress and/or egress port 314 may be established using a dedicated and separate physical port, each of which is identified by a physical port address, or using a dedicated virtual port identified by a virtual port address, where a single physical port may be programmed to incorporate a communication link to one or more virtual ports, in various approaches.

Each of the ingress ports may be established as a first virtual port identified with a first virtual address, e.g., a first MAC address, and each of the egress ports may be established as a second virtual port identified with a second virtual address, e.g., a second MAC address. For example, the first virtual port may be associated with a first physical port address, and the second virtual port may be associated with a second physical port address, the first and second virtual ports may be associated with a single physical port address, etc.

Figure 4:
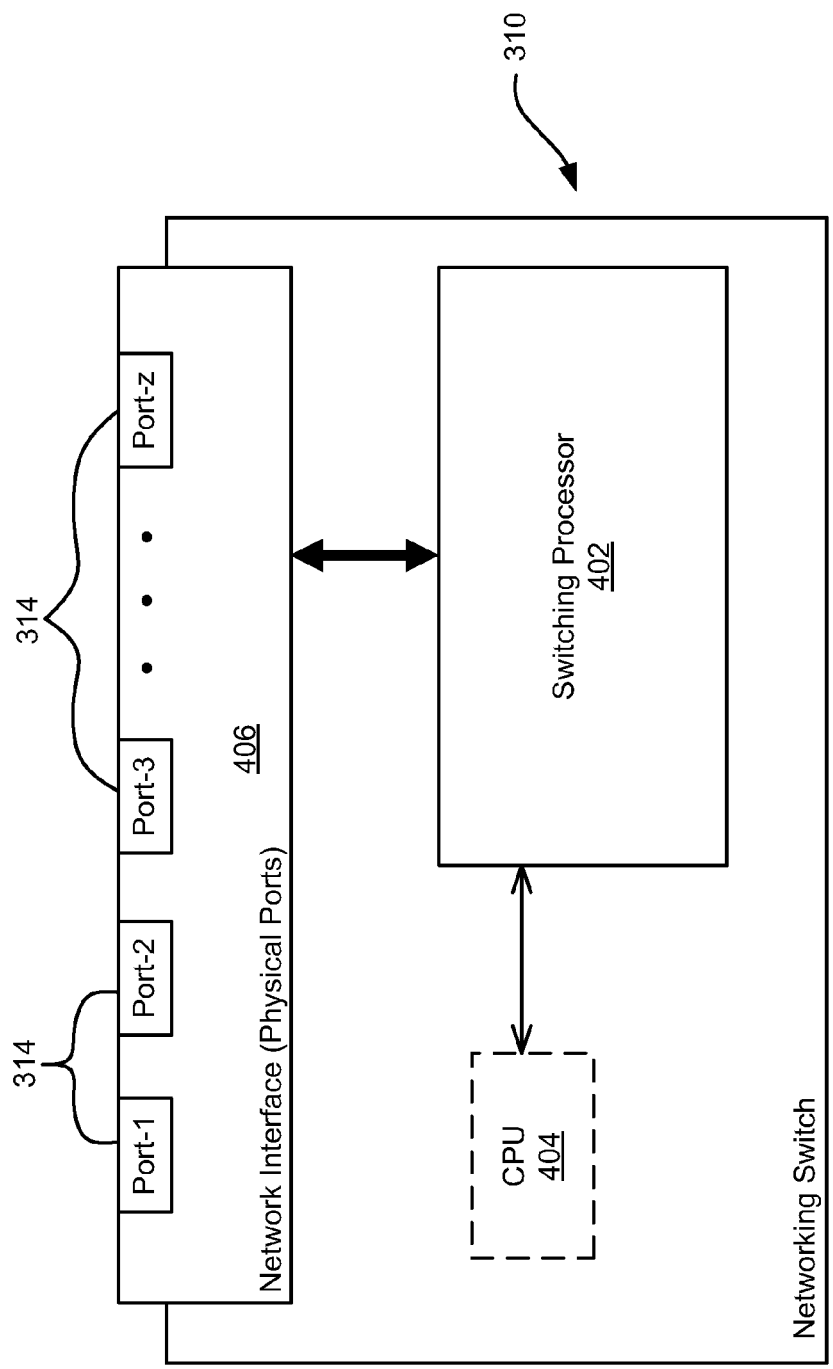
FIG. 4 shows a more detailed view of a network switching system, according to one embodiment.

A more detailed view of a physical networking switch 310 is shown in FIG. 4, according to one embodiment. The physical networking switch 310, in one approach, may comprise a network interface 406, a switching processor 402, and a CPU subsystem 404 (having a CPU or some other processor therein). The network interface 406 includes a plurality of physical ports 314, each physical port 314 being identified using a unique physical port address, in one approach. The switching processor 402 may be any type of processor known in the art, such as a CPU, an application specific integrated circuit (ASIC), a field programmable gate array (FPGA), a microcontroller, a microprocessor, etc., and may be included in a switching platform that provides the capability to receive an incoming packet via an ingress port, process the incoming packet to acquire or generate packet control information, and transmit (or forward) an outgoing packet, corresponding to the incoming packet, via an egress port using the packet control information. The ingress and egress ports are generally labeled ports 314 for the sake of these descriptions, and a port 314 used as an ingress port in one situation may be used as an egress port in another situation.

In one embodiment, the at least one physical networking switch 310 may comprise logic adapted to receive a first networking packet, logic adapted to generate a second networking packet that encapsulates at least a payload of the first networking packet, and logic adapted to forward the second networking packet (such as to the physical networking server 306).

The switching processor 402 may use the local CPU subsystem 404 to provide processing capability to manage the generation and transmission of the second networking packet (outgoing packet), which may encapsulate the first networking packet or portions thereof (including information based on the first networking packet). In another embodiment, the CPU subsystem 404 may offload the classification and management of packet processing to the scalable and distributed control plane 302. In yet another embodiment, the switching processor 402 may perform these functions itself.

Figure 5:
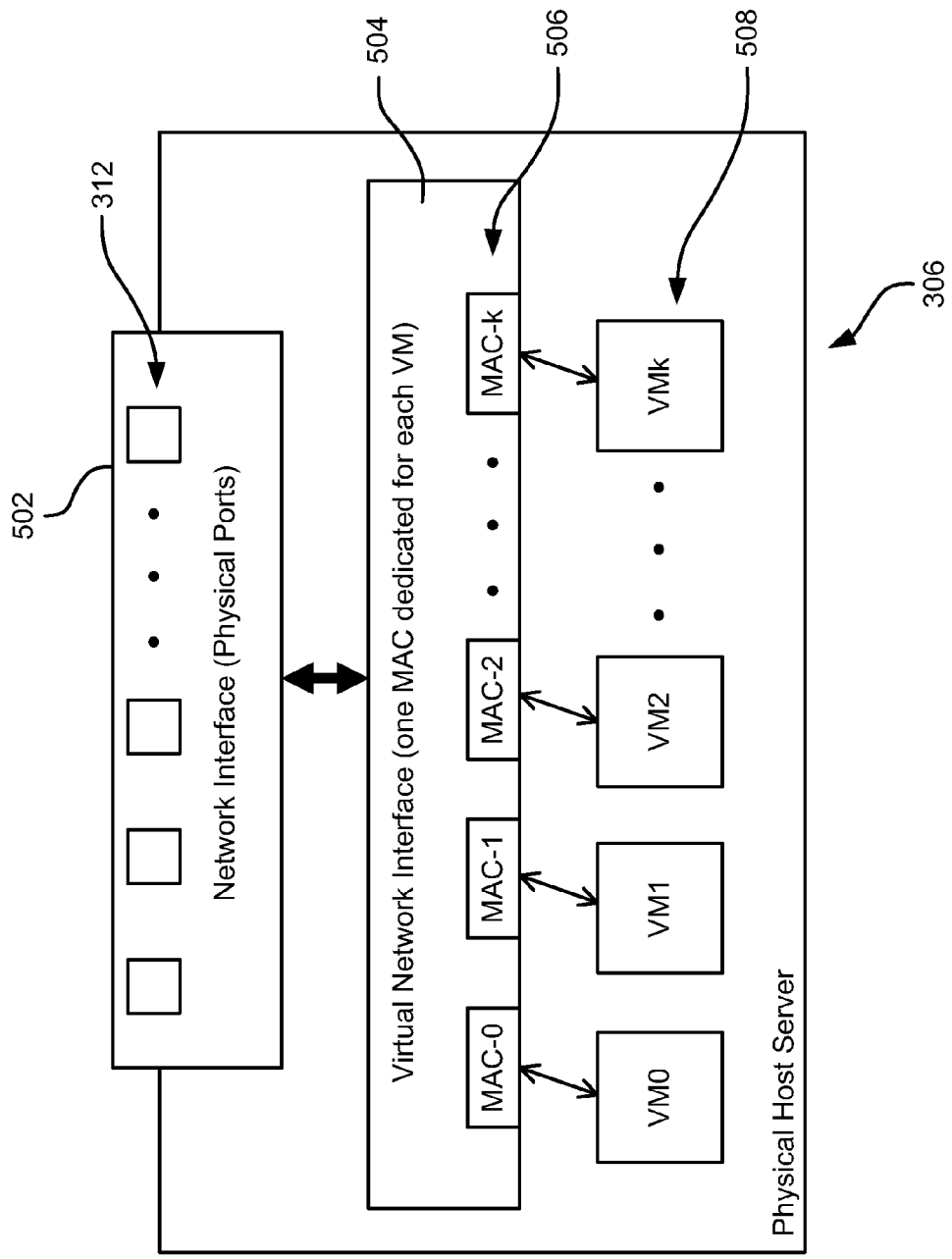
FIG. 5 shows a more detailed view of a control plane server, in accordance with one embodiment.

Now referring to FIG. 5, a more detailed view of a physical host server 306 is shown, according to one embodiment. The physical host server 306 may comprise a network interface 502, a virtual network interface 504, and a plurality of VMs 508 (VM0, VM1, . . . , VMk). Each of the VMs 508 may be associated with one virtual network interface port 506 identified using a dedicated MAC address (MAC-0, MAC-1, . . . , MAC-k), in one approach. Furthermore, each of the MAC addresses of the virtual network interface 504 may be associated with at least one physical port 312 of the network interface 502, each physical port 312 being identified using a physical port address, in one approach.

An incoming packet (such as the second networking packet) received using one of the physical ports 312 of the network interface 502 may be processed and appropriately forwarded to a corresponding VM 508 using information included within the incoming packet, such as header information of an external packet or an internal, encapsulated packet.

Referring now to FIGS. 3-5, each VM 508 may be adapted to process at least one type of networking packet. In this way, the VM 508 may include logic adapted to receive the second networking packet, logic adapted to decapsulate the second networking packet to retrieve at least the first networking packet or some portion thereof (if necessary, such as when the second networking packet is designed to encapsulate another packet or portion thereof, such as an overlay packet or some other type of packet capable of encapsulating another packet, such as the first networking packet), and logic adapted to handle processing of the first networking packet to obtain forwarding information sufficient to allow the at least one physical networking switch 310 or some other component of the network 308 to deliver the first networking packet to its intended destination. Any processing that is helpful or useful in performing any functions related to the networking packets may be performed, such as reading the networking packet, classifying the networking packet, resending the networking packet, etc.

The at least one VM 508 also includes logic adapted to encapsulate the first networking packet into a third networking packet comprising the forwarding information. In this way, the third networking packet may be forwarded to another VM 508, another physical host server 306, another networking switch 310, or any other component capable of delivering the third networking packet to its intended destination. The third networking packet is adapted to encapsulate the first networking packet or a portion thereof such that once the third networking packet is delivered to its intended destination, the first networking packet may be decapsulated from the third networking packet and delivered to its intended destination as the first networking packet.

Accordingly, the at least one VM 508 also includes logic adapted to forward the third networking packet, such as to the at least one physical networking switch 310 or some other component of the network 308 capable of handling the third networking packet, such that the third networking packet may be delivered to its intended destination. The third networking packet may be transmitted via the VM 508 to the virtual network interface 504 which appropriately forwards the third networking packet to an associated physical port 312 of the network interface 502 of the physical host server 306.

The physical host server 306 is programmable in order to establish at least one virtual network interface port 506 that may be used to establish a communication channel between:
1. a network interface physical port 312 of the physical host server 306, and
2. at least one VM 508 established within the physical host server 306, where each VM 508 is accessible via a unique MAC address (via a virtual network interface port 506).

In one embodiment, a scalable and distributed virtual control plane 302 may include at least one physical host server 306 having a plurality of VMs 508 running thereon which are configured to use resources of the physical host server 306. In another embodiment, the scalable and distributed virtual control plane 302 may comprise a first physical host server 306a hosting a first VM 508 (e.g., VM0) used to process networking packets: (i) that are of certain types, and/or (ii) when a certain condition is met for a networking packet, and/or (iii) that require a specific handling requirement, e.g., the networking packets utilize a certain protocol type, such as overlay (NVGRE, VXLAN, etc.), TRILL, STP, etc.

For example, some additional requirements may comprise the processing of certain networking packets that require special handling, e.g., security or service priority, where a dedicated VM 508 hosted by a certain physical host server 306 may be used to meet such demand. Of course, within each scalable and distributed control plane 302, many VMs 508 may be established where each VM 508 is programmed to handle any user defined requirement or specified condition, such that the processing of networking packets may be split according to any user desired methodology and/or according to an optimum setting designed by the scalable and distributed control plane 302.

Exemplary records of information that may be used in the classification processing of the first networking packet on at least one of the plurality of VMs 508 hosted by the at least one physical host server 306, as described above in FIGS.

Figure 6:
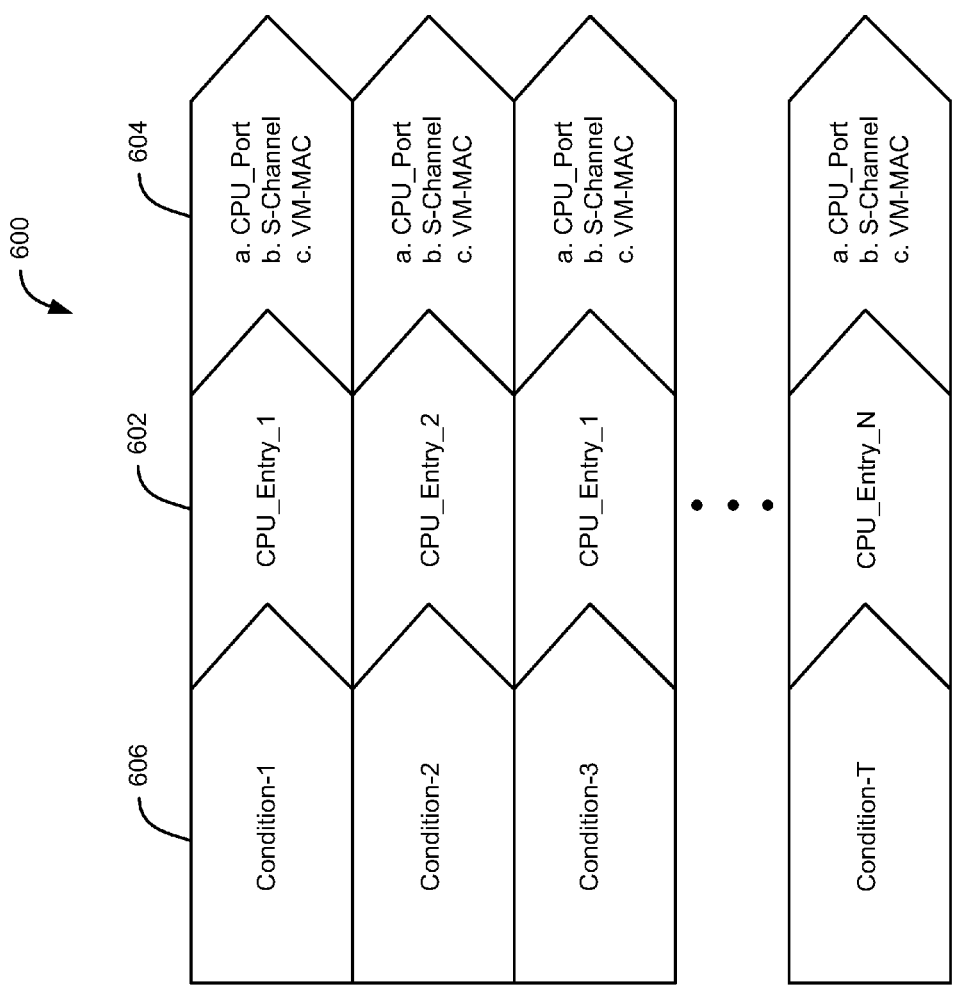
FIG. 6 is a flowchart of a method in one embodiment.

3-5, are shown in FIG. 6, according to one embodiment. There are many various options possible to those of skill in the art to organize, program, and/or store such information. A simple look-up table 600 type is shown in FIG. 6 for this example. Other types of ways to organize and/or store the information may be used, such as a database, a list, a chart, an indexed file system, etc.

As shown in FIG. 6, each record (CPU_Entry_N) 602 in the look-up table 600 includes a pre-programmed set of information 604. Furthermore, there is a set of predetermined conditions 606, which each predetermined condition 606 being matched to at least one of the various records 602. In this example, the set of information 604 stored for each record 602 includes: (a) egress port information (or CPU_Port) that may also include the physical address of the network interface port to be used for transmitting the second networking packet, where the egress port information may be a multicast (MC) group identifier intended for one or more CPU_Ports; (b) information associated with a service tag (e.g., IEEE 802.1q S-tag); and (c) MAC address information corresponding to the VM designated to receive and process the second networking packet (which includes the first networking packet or portion thereof), where the MAC address information may be a MC MAC address intended to forward the second networking packet to one or more VMs.

The pre-programmed set of information 604 may be retrieved upon activation of a corresponding CPU_Port entry process. Each CPU_Port entry process may be started when a certain condition 606 is met during the classification of the first networking packet by the networking switch or some other component of the network.

Furthermore, at least one of the preprogrammed conditions 606 (e.g., Condition-1 through Condition-T) may be used to select any one of the egress ports (e.g., CPU_Entry_1 through CPU_Entry_N), such that it is feasible to direct one or more conditions 606 to select the same CPU_Entry 602. This ensures that the flexibility is provided to match and distribute the virtual control plane processing capability based on the networking switch processing requirements and/or desired performance.

This mechanism enables partitioning of the whole control plane of a networking switch into multiple smaller sub-control planes. By creating different conditions 606 in the table 600 which identify a specific control packet protocol on each switching port, and then sending control packets that use that designated protocol to the specified CPU_Entry 602 after pre-processing and encapsulating the packet into another packet, the control plane is effectively split into multiple sub-control planes.

Also, in some approaches, each sub-control plane may process one or more control protocols, and/or each sub-control plane may execute as a VM on a virtualization platform (such as Hypervisor, Hyper-V, etc.) of a physical host server.

In another embodiment, control packets may be received for processing based on entries in a look-up table 600 stored locally to a switching processor using each sub-control plane, and a redundant sub-control plane may be created for each sub-control plane to provide for high availability.

Figure 7:
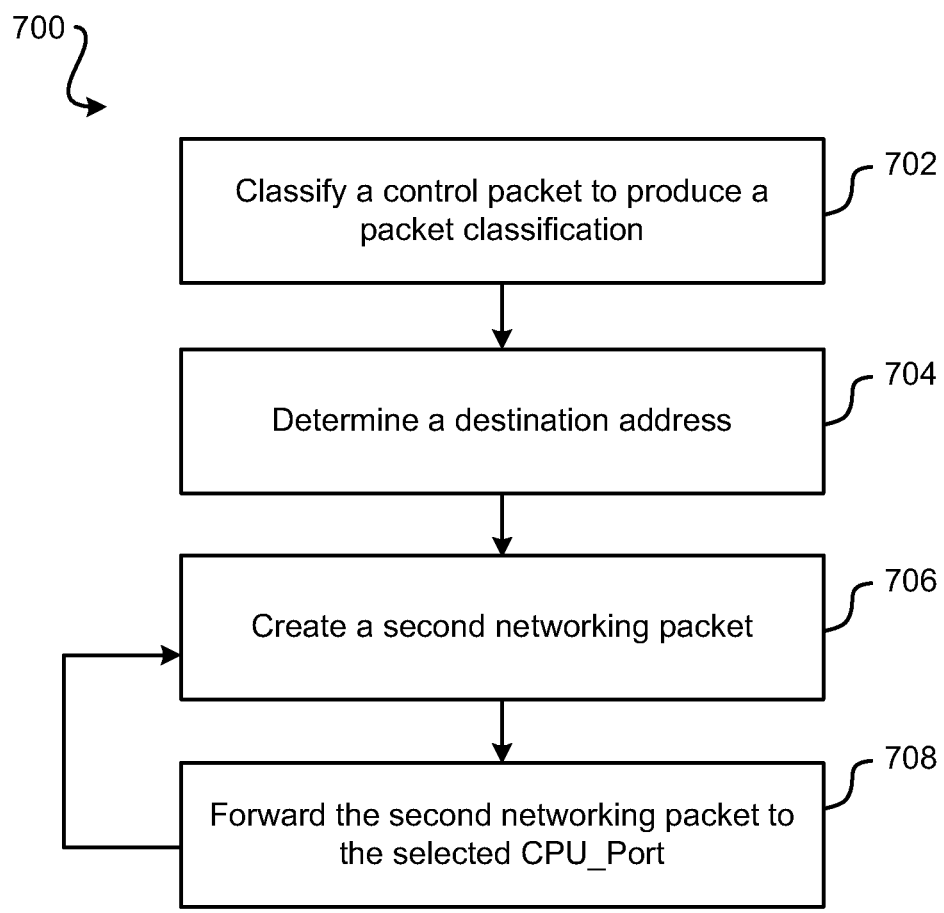
FIG. 7 shows some exemplary records of information, according to one embodiment.

Now referring to FIG. 7, a method 700 for processing an incoming networking packet, such as using a remote VM, is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in some embodiments, the method 700 may be partially or entirely performed by a virtual control plane, a physical networking switch, a combination thereof, etc.

Any type of networking packet may be used in conjunction with method 700, particularly a control packet in some approaches.

As shown in FIG. 7, method 700 may initiate with operation 702, where a control packet is classified to obtain a control packet classification. In one embodiment, a physical networking switch may receive a first control packet via an ingress port, and the control packet may be classified using any available information, such as a source address of the control packet, specific routing information of the control packet, and/or information that corresponds to a certain property of the control packet.

In operation 704, a destination address to send the first networking packet is determined based on the packet classification in order to provide processing for the first networking packet.

In one embodiment, the determination may be based on: (i) information that is included within the control packet; and/or (ii) information that is extracted from the control packet.

For example, a look-up table may be used to determine the destination address. Specifically, a condition may be selected from the look-up table to which the packet classification adheres, an entry may be selected that is associated with the selected condition, and a set of information may be determined that is associated with the selected entry. The look-up table may comprise a plurality of entries, a plurality of conditions, and a plurality of sets of information from which the selected entry and the selected set of information is chosen. According to one embodiment, each condition is associated with one entry, each entry is associated with one set of information, and any entry is capable of being associated with more than one condition.

Each set of information may comprise at least: an address ID, a service tag, and a MAC ID. The address ID may comprise information that corresponds to one or more egress ports of the at least one physical networking switch, the MAC ID may include a destination address that corresponds to at least one VM designated to receive the second networking packet based on the packet classification, and the service tag may comprise information that corresponds to a membership of the second networking packet within one VLAN in accordance with any one of: a networking protocol, a port based protocol, and a port based networking protocol.

Alternatively, in another embodiment, the address determination procedures for the control packet, as described above, may comprise the determination of the following address data information: (i) determining an egress port (or CPU port) of a physical networking switch to be used to transmit a second networking packet encapsulating the control packet, which may also include determining the address of a network interface physical port associated with the determined egress port; (ii) determining information associated with a service tag (e.g., IEEE 802.1q S-tag); and (iii) determining a MAC address corresponding to a VM designated to receive and process the second networking packet. Of course, in some embodiments, more information may be determined and the determination is not limited to the information described above.

Each of the one or more egress ports may comprise information that corresponds to an egress port of the at least one physical networking switch which is used to transmit the second networking packet, and/or information that corresponds to an address of a network interface physical port associated with the egress port.

The look-up table may be used to look-up programmable information that identifies at least one of: (i) an egress port (or CPU port) of the at least one physical networking switch to be used to transmit the second networking packet, which may also include the address of the network interface physical port associated with the egress port, where each CPU entry may identify one or multiple VMs; (ii) a service tag (e.g., IEEE 802.1q S-tag); and (iii) a MAC address corresponding to the VM designated to receive and process the second packet. The identification of a condition for which the CPU Entry or port is to be used to process the content of the second networking packet is based on at least some information included within the control packet, in some approaches.

In one approach, a CPU entry may be used as a pointer to an entry in the look-up table that includes information to be used for generating content for the second networking packet. It is important to note that each CPU entry may identify one or multiple VMs. Furthermore, the information used to determine the destination address may also include at least one of the following: (i) a source address of the control packet; (ii) specific routing information, e.g., VLAN; (iii) a specific request to process the second networking packet in accordance with a programmable (predetermined) procedure; and (iv) information that is related to a certain property of the control packet.

In operation 706, a second networking packet may be generated that includes at least a portion of the control packet. This second networking packet may be a L2 packet, and may include an outer MAC header where the S-Channel is the S-Tag, and includes the MAC address(es) of the VM(s).

In operation 708, the second packet may be transmitted (forwarded) to a designated port (CPU_Port) of a physical host server, such as by using an egress port of the physical networking switch. In one embodiment, the CPU_Port may be a physical egress port of the physical host server.

The physical host server may then receive and process the second networking packet using one or more VMs thereof, which in turn generate a third networking packet based on information included within the second networking packet about the control packet. Furthermore, one VM may transmit the third networking packet back to the networking switch using at least some of the information included within the second networking packet.

Figure 8:
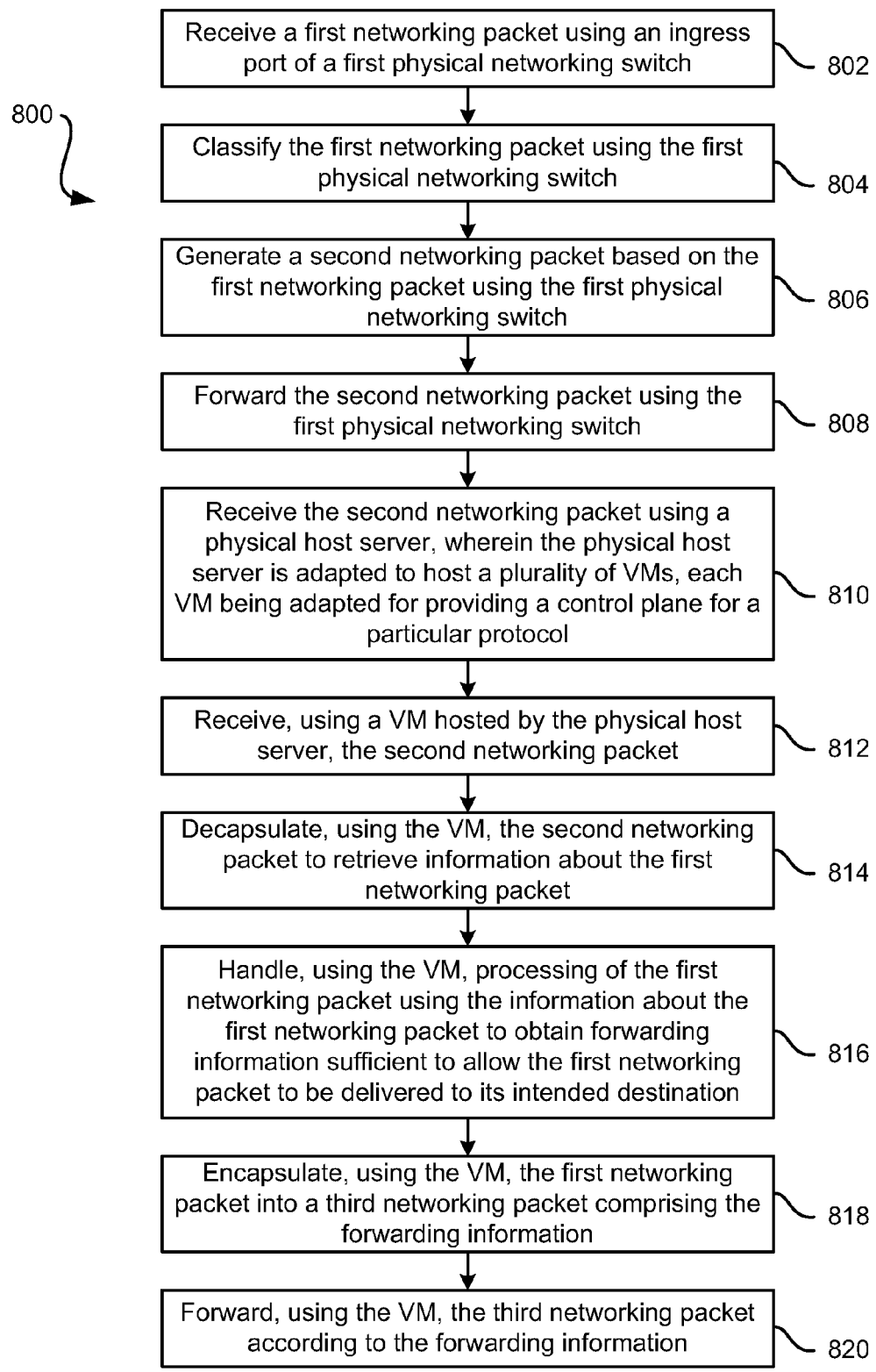
FIG. 8 is a flowchart of a method, according to one embodiment.

Now referring to FIG. 8, a flowchart of a method 800 for processing a packet within a networking system is shown, according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in some embodiments, the method 800 may be partially or entirely performed by a virtual control plane, a physical control plane, a combination thereof, etc.

As shown in FIG. 8, method 800 may initiate with operation 802, where a first networking packet is received using a first physical networking switch, such as via an ingress port thereof.

In operation 804, the first packet is classified using the first physical networking switch.

In operation 806, a second networking packet based on the first networking packet is generated using the first physical networking switch.

In operation 808, the second networking packet is forwarded using the physical networking switch.

In operation 810, the second networking packet is received using a physical host server, wherein the physical host server is adapted to host a plurality of VMs, each VM being adapted for providing a control plane for a particular protocol. In this way, each separate protocol, such as open shortest path first (OPSF), spanning tree, border gateway protocol (BGP), or any other protocol known in the art, may have one or more dedicated VMs which are adapted for processing control plane packets for that particular protocol. In another embodiment, more than one protocol may be supported by a single VM, when the processing requirements are low and handled by a single VM. However, it is most easily understood and compartmentalized to have a separate VM handle the responsibilities for each separate protocol on a one-to-one basis.

In operation 812, the second networking packet is received using a VM hosted by the physical host server.

In operation 814, the second networking packet is decapsulated, using the VM, to retrieve information about the first networking packet.

In operation 816, processing of the first networking packet is handled, using the VM, according to the information about the first networking packet to obtain forwarding information sufficient to allow the first networking packet to be delivered to its intended destination.

In operation 818, using the VM, the first networking packet is encapsulated into a third networking packet comprising the forwarding information.

In operation 820, using the VM, the third networking packet is forwarded according to the forwarding information.

In another embodiment, the first classification data may be generated based on the second set of information, wherein the second set of information may include programmable records of information that are stored within the at least one physical networking switch. Also, the first classification data may include at least: a first address ID comprising information that corresponds to one or more egress ports of the at least one physical networking switch, a service tag comprising information that corresponds to a membership of the second packet within exactly one VLAN in accordance with any one of: a networking protocol, a port based protocol, and a port based networking protocol, and a MAC ID including information that corresponds to at least one VM designated to receive the second packet.

In accordance with another embodiment, each of the one or more egress ports of the at least one physical networking switch may include information that corresponds to an address of a network interface physical port associated with each egress port.

In operation 808, metadata is determined based on information included within the first packet using the first physical networking switch. In one approach, determining the metadata may comprise using information included within the first packet including at least: a source address of the first packet, specific routing information, a specific request to process the second packet in accordance with a programmable procedure, and information that corresponds to a certain property of the first packet.

In operation 810, a second packet is generated using at least the first classification data, the determined metadata, and at least a third set of information using the first physical networking switch, wherein the third set of information is based on information included within the first packet.

In one approach, generating the second packet may comprise using at least: the first classification data, the metadata, and a set of information based on content of the first packet.

In operation 812, the second packet is forwarded using an egress port of the first physical networking switch.

In operation 814, the second packet is received using an ingress port of a first control plane server.

In operation 816, the first physical networking switch and the first control plane server are linked via a network. The network comprises at least one of: a direct link, a wired communication channel, and a wireless communication channel.

In a further embodiment, the method 800 may further include processing the received second packet using the first control plane server, generating a third control packet using information included within the second packet, and transmitting the third packet to the first physical networking switch using an egress port of the first control plane server.

In one embodiment, the method 800 may be embodied in a computer program product for processing a first networking packet within a networking system. The computer program product may comprise a computer readable storage medium having computer readable program code embodied therewith, the computer readable program code comprising: computer readable program code configured to receive a first networking packet; computer readable program code configured to classify the first networking packet to produce a packet classification; computer readable program code configured to determine a destination address to send the first networking packet based on the packet classification in order to provide processing for the first networking packet by: selecting a condition from a look-up table to which the packet classification adheres, selecting an entry associated with the selected condition, and determining a set of information associated with the selected entry, wherein the look-up table comprises a plurality of entries, a plurality of conditions, and a plurality of sets of information, each condition is associated with one entry, each entry is associated with one set of information, each set of information comprises destination information for one of a plurality of VMs, each VM being adapted for providing a control plane for a particular protocol (such that the destination information leads the packet to be delivered to a VM capable of providing a control plane for that packet), and any entry is capable of being associated with more than one condition. Furthermore, each set of information may comprise at least: an address ID, a service tag, and a MAC ID, computer readable program code configured to generate a second networking packet by encapsulating the first networking packet into the second networking packet, and computer readable program code configured to forward the second networking packet to at least one physical host server to handle processing of the first networking packet, wherein the address ID comprises information that corresponds to one or more egress ports of a physical networking switch, the MAC ID includes a destination address that corresponds to at least one VM, of the plurality of VMs, designated to receive the second networking packet hosted by the at least one physical host server based on the packet classification, and the service tag comprises information that corresponds to a membership of the second networking packet within one VLAN in accordance with any one of: a networking protocol, a port based protocol, and a port based networking protocol.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A networking system, comprising:
   at least one physical networking switch, comprising:
     logic configured to receive a first networking packet;
     logic configured to classify the first networking packet to produce a packet classification;
     logic configured to generate a second networking packet based on the first networking packet; and
     logic configured to forward the second networking packet;
   a scalable and distributed virtual control plane, comprising:
     at least one physical host server configured to host a plurality of virtual machines (VMs), each VM being configured to provide a sub-control plane corresponding to an assigned particular protocol according to conditions in a look-up table, the conditions identifying a protocol used on each switching port of the at least one physical host server, wherein a control plane is partitioned into a plurality of sub-control planes corresponding to a number of protocols used in the networking system with each of the plurality of VMs being configured to exclusively provide and process control packets for one of the plurality of sub-control planes for the assigned particular protocol; and
   a network connecting the at least one physical networking switch to the at least one physical host server,
   wherein each of the plurality of VMs comprises:
     logic configured to receive the second networking packet;
     logic configured to decapsulate the second networking packet to retrieve information about the first networking packet;
     logic configured to handle processing of the first networking packet using the information about the first networking packet to obtain forwarding information sufficient to allow the first networking packet to be delivered to its intended destination;
     logic configured to encapsulate the first networking packet into a third networking packet comprising the forwarding information; and
     logic configured to forward the third networking packet, using one of the plurality of VMs, according to the forwarding information.

2. The networking system as recited in claim 1, wherein the logic configured to generate the second networking packet based on the first networking packet comprises encapsulating the first networking packet into the second networking packet.

3. The networking system as recited in claim 1, wherein the at least one physical networking switch further comprises:

logic configured to determine a destination address to send the first networking packet based on the packet classification in order to provide processing for the first networking packet.

4. The networking system as recited in claim 3, wherein the logic configured to determine the destination address to provide processing for the first networking packet comprises logic configured to use the look-up table to determine the destination address.

5. The networking system as recited in claim 4, wherein the logic configured to use the look-up table to determine the destination address comprises:
  logic configured to select a condition from the look-up table to which the packet classification adheres;
  logic configured to select an entry associated with the selected condition; and
  logic configured to determine a set of information associated with the selected entry,
  wherein the look-up table comprises:
    a plurality of entries;
    a plurality of conditions; and
    a plurality of sets of information.

6. The networking system as recited in claim 5,
  wherein each of the VMs is associated with one virtual network interface port of the at least one physical host server identified using a dedicated media access control (MAC) address,
  wherein each MAC address of the virtual network interface is associated with at least one physical port of a physical network interface of the at least one physical host server,
  wherein each condition is associated with one entry,
  wherein each entry is associated with one set of information,
  wherein each set of information comprises destination information for one of the plurality of VMs, and
  wherein any entry is capable of being associated with more than one condition.

7. The networking system as recited in claim 5,
  wherein each set of information comprises at least: an address identifier (ID), a service tag, and a media access control (MAC) ID,
  wherein the address ID comprises information that corresponds to one or more egress ports of the at least one physical networking switch,
  wherein the MAC ID includes a destination address that corresponds to at least one VM of the plurality of VMs designated to receive the second networking packet based on the packet classification, and
  wherein the service tag comprises information that corresponds to a membership of the second networking packet within one virtual local area network (VLAN) in accordance with any one of: a networking protocol, a port based protocol, and a port based networking protocol.

8. The networking system as recited in claim 7, wherein each of the one or more egress ports comprises information that corresponds to an egress port of the at least one physical networking switch which is used to transmit the second networking packet.

9. The networking system as recited in claim 7, wherein each of the one or more egress ports comprises information that corresponds to an address of a network interface physical port associated with the egress port.

10. The networking system as recited in claim 1, wherein the logic configured to classify the first networking packet to produce the packet classification utilizes at least:
  a source address of the first networking packet;
  specific routing information of the first networking packet; and
  information that corresponds to a certain property of the first networking packet.

11. A computer program product for processing a first networking packet within a networking system, the computer program product comprising a computer readable storage medium having computer readable program code embodied therewith, the computer readable program code comprising:
  computer readable program code configured to receive a first networking packet;
  computer readable program code configured to classify the first networking packet to produce a packet classification;
  computer readable program code configured to determine a destination address to send the first networking packet based on the packet classification in order to provide processing for the first networking packet by:
    selecting a condition from a look-up table to which the first networking packet classification adheres;
    selecting an entry associated with the selected condition; and
    determining a set of information associated with the selected entry,
    wherein the look-up table comprises a plurality of entries, a plurality of conditions, and a plurality of sets of information,
    wherein each condition is associated with one entry,
    wherein each entry is associated with one set of information,
    wherein each set of information comprises destination information for one of a plurality of virtual machines (VMs) based on protocol used by the first networking packet, each VM being configured to provide a sub-control plane corresponding to an assigned particular protocol according to the conditions in the look-up table, the conditions identifying a protocol used on each switching port of at least one physical host server, wherein a control plane is partitioned into a plurality of sub-control planes corresponding to a number of protocols used in the networking system with each of the plurality of VMs being configured to exclusively provide and process control packets for one of the plurality of sub-control planes for the assigned particular protocol, and
    wherein any entry is capable of being associated with more than one condition,
    wherein each set of information comprises at least: an address identifier (ID), a service tag, and a media access control (MAC) ID;
  computer readable program code configured to generate a second networking packet by encapsulating the first networking packet into the second networking packet; and
  computer readable program code configured to forward the second networking packet to the at least one physical host server to handle processing of the first networking packet,
  wherein the address ID comprises information that corresponds to one or more egress ports of a physical networking switch,
  wherein the MAC ID includes a destination address that corresponds to at least one VM of the plurality of VMs designated to receive the second networking packet hosted by the at least one physical host server based on the packet classification, and wherein the service tag comprises information that corresponds to a membership of the second networking packet within one virtual local area network (VLAN) in accordance with any one of: a networking protocol, a port based protocol, and a port based networking protocol.

12. A networking system, comprising:

at least one physical host server configured to host a plurality of virtual machines (VMs), each VM being configured for providing a sub-control plane corresponding to an assigned particular protocol according to conditions in a look-up table, the conditions identifying a protocol used on each switching port of the at least one physical host server, wherein a control plane is partitioned into a plurality of sub-control planes corresponding to a number of protocols used in the networking system, wherein each of the plurality of VMs comprises:

logic configured to receive a second networking packet from a physical networking switch, the second networking packet adhering to a particular protocol;

logic configured to exclusively provide and process control packets for one of the plurality of sub-control planes for the particular protocol;

logic configured to decapsulate the second networking packet to retrieve information about a first networking packet;

logic configured to handle processing of the first networking packet using the information about the first networking packet to obtain forwarding information sufficient to allow the first networking packet to be delivered to its intended destination;

logic configured to encapsulate at least a portion of the first networking packet into a third networking packet comprising the forwarding information; and logic configured to forward, using one of the plurality of VMs, the third networking packet in accordance with the forwarding information.

13. The networking system as recited in claim 12, wherein the information about the first networking packet comprises a packet classification as determined by the physical networking switch.

14. The networking system as recited in claim 12, wherein each of the VMs is associated with one virtual network interface port of the at least one physical host server identified using a dedicated media access control (MAC) address.

15. The networking system as recited in claim 14, wherein each MAC address of the virtual network interface is associated with at least one physical port of a physical network interface of the at least one physical host server.

* * * * *